July 22, 1941.                J. A. WILLIAMSON                2,250,119
                    MANUFACTURE OF ABRASIVE COATED WEBS
                           Filed March 25, 1940

INVENTOR.
JOHN A. WILLIAMSON
BY
ATTORNEY.

Patented July 22, 1941

2,250,119

UNITED STATES PATENT OFFICE 2,250,119

MANUFACTURE OF ABRASIVE COATED WEBS

John A. Williamson, Niagara Falls, N. Y., assignor to The Carborundum Company, Niagara Falls, N. Y., a corporation of Delaware Application March 25, 1940, Serial No. 325,809

5 Claims. (Cl. 51—293).

This invention relates to the manufacture of abrasive coated webs, and in particular to the application of a mixture of abrasive grains and a liquid adhesive binding agent in the production of a uniformly coated abrasive product.

In the usual process, by which coated abrasive materials have been made for many years, it has been customary to coat the backing sheet of paper or cloth with a layer of glue or other suitable adhesive and then to apply a layer of abrasive grains to the adhesive coated sheet. After this first layer of adhesive had set, a second or sizing layer of adhesive was applied over the layer of abrasive grains in order more firmly to anchor the grains to the web backing. This sizing layer of adhesive was applied by means of a rubber covered roll partially immersed and revolving in a pan of liquid adhesive and contacting with the abrasive coated surface. When this sizing layer dried or set, the adhesive shrunk around the bases of the grains and held them firmly in position.

Three separate steps were necessary in such a process, in which the base coating of adhesive was applied by one set of adhesive rolls, the grain then applied thereon, and a sizing or protecting layer of adhesive applied over the abrasive layer.

The material produced by the above process had a highly serrated surface in which the individual abrasive particles were positioned at varying heights above the surface of the backing material and formed a large number of "hills" and "valleys." While this is highly desirable in certain abrasive products where a high cutting rate is advantageous, it is a distinct disadvantage in certain other products, such as metallographic and lens polishing materials. These materials are required in such abrading and polishing operations requiring mirror-like surfaces, where even minute scratches cannot be tolerated.

Other important uses for such materials include abrasive coated materials known as "snuffing paper," used in the tanning industry, "pouncing paper," employed in the manufacture of felt hats, and "tympan paper," which prevents ink offset in printing.

In another process, which has been employed in manufacturing very fine grit abrasive coated material, the abrasive grain or powder is mixed with a waterproof adhesive, and this mixture applied to a moving web by the usual roll means. In such a process, a rubber covered roll is partially immersed and revolves in a pan containing the mixture of liquid adhesive and abrasive powder, while a cooperating pressure roll serves to squeeze the layer of the abrasive mixture to a desirable thickness. This process has been used in preparing the abrasive covered paper and cloth material commonly referred to a crocus cloth, which is used in the metal polishing field.

The above method of manufacturing polishing paper and cloth has a very decided disadvantage in that the adhesive-grain mixture is not applied in a uniform layer, and the projecting tips of the granules are not at a uniform height above the backing. Furthermore, it is exceedingly difficult, if not impossible, to prevent the formation of glue strings and ridges in the surface coating. The natural tendency of the adhesive-grain mixture to cling to the applicator roll causes such irregularities to be formed in the surface of the applied coating.

In an effort to eliminate such undesirable surface irregularities, various types of reciprocating brushes have been employed. These oscillating brushes did smooth out the ridges and glue strings to a certain extent, but on the other hand produced brush marks which are also very undesirable. Any surface irregularities are detrimental in the finished product, and the materials produced by the above methods have never been entirely satisfactory.

I have found that the above difficulties of manufacturing coated abrasive and/or polishing materials can be overcome and a uniform coating of mixed abrasive and adhesive can be produced. This is accomplished by eliminating the usual pressure rolls, and instead applying a layer of a mixture or suspension of abrasive grains and adhesive. I prefer to apply an excessive quantity of the mixture, in order to avoid the detrimental action of the pressure rolls, and then to remove such excess by means of an "air knife" or gas jet extending traversely across the coated web and adapted to direct a stream of high velocity gas against the coated abrasive surface. This gas is suitably heated and/or treated with a solvent of the adhesive so that it will not set or chill the adhesive when directed against the layer of adhesive-grain mixture, but will cut away and remove the excess thickness of the mixture, leaving a layer of desired thickness, and also drive any adhesive from the uppermost points of the grains down and around the bases of said grains. Thus a smooth and uniform layer of the mixture of desired thickness is applied without the deleterious effect of pressure rolls which produce surface inequalities; and at the same time, the cutting points of the grain are cleared of the adhesive film. Furthermore, a strong bond is produced at the base of the grains.

A more detailed description of the use and operation of the "air knife" may be found in my copending application, Serial No. 281,421, filed June 27, 1939, and issued May 21, 1940 as U. S. Patent No. 2,201,196.

The novel features will be best understood from the following description and the annexed drawing, in which I have shown diagrammatically certain selected features by which a coated abrasive material may be produced.

Figure 1:
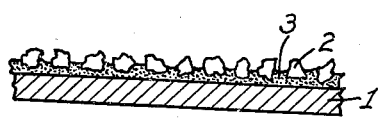
Figure 1 is an enlarged section through a fragment of abrasive coated web manufactured according to my invention.

Referring to Figure 1, which illustrates a fragment of an abrasive coated web made according to this invention, reference numeral 1 indicates the web or backing, which may be of any of the usual flexible materials, such as paper, cloth, and the like. Applied to one face of the web 1 is a layer of previously mixed abrasive grains 2 and a liquid adhesive binder 3 such as glue, varnish, silicate, or synthetic resinous material. It may be noted that the abrasive grains 2 as shown in Figure 1, are so positioned that their cutting points lie in approximately the same plane, that is, at equal distance from the web backing 1.

Figure 2:
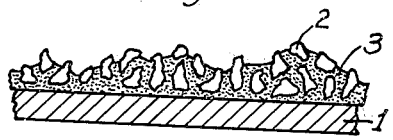
Figure 2 is an enlarged section through a fragment of abrasive coated web manufactured according to previous practice.

Figure 2 shows a fragment of an abrasive coated web produced by the previously employed methods, in which a layer of a mixture of abrasive grains 2 and adhesive 3 was applied to the backing 1 by a roller, and an oscillating brush used in an effort to smooth out the resulting ridges. As will be noted, the ridges and streaks, caused by the tendency of the abrasive grain-adhesive mixture to cling to the applicator roll, have not been entirely removed by the brush. In fact, the usual tendency of the brush is to produce brush marks and additional surface irregularities, which results in a haphazardly positioned and pyramided layer of abrasive grains, in which some grains are at a greater distance from the backing than are other adjacent grains.

While the abrasive coated article illustrated in Figure 2 has been described as having been made by the old process of mixing grain and adhesive and applying by a pair of co-acting pressure rolls, I have also found that a similar article was usually obtained with the known process of manufacture in which abrasive grains were dropped onto a previously coated adhesive web. In this latter process, the grains usually sank down into the layer of adhesive, permitted the adhesive to penetrate up between grains, and this permitted a second layer of grains to adhere on top of the first layer and in the crevices between the first-adhered granules. The result was an abrasive coating of several grains in thickness, and the secondary or uppermost layer of grains was not only undesirable, but was insecurely anchored to the first layer. Obviously, such a process of coating did not produce a layer of uniform thickness, since the adherence of the grains was dependent entirely upon the erratic tendency of the adhesive to penetrate up between the grains. These disadvantages have been found to be particularly true with the fine grit abrasive materials, such as 280 to 600 mesh and finer. These very fine grit materials are extremely difficult to apply uniformly by the usual distributing methods. The particles of abrasive powder are not always individually separated, and tend to cling together and form clusters and aggregates, which, when applied, produce the undesirable effect of coarse grain particles.

Figure 3:
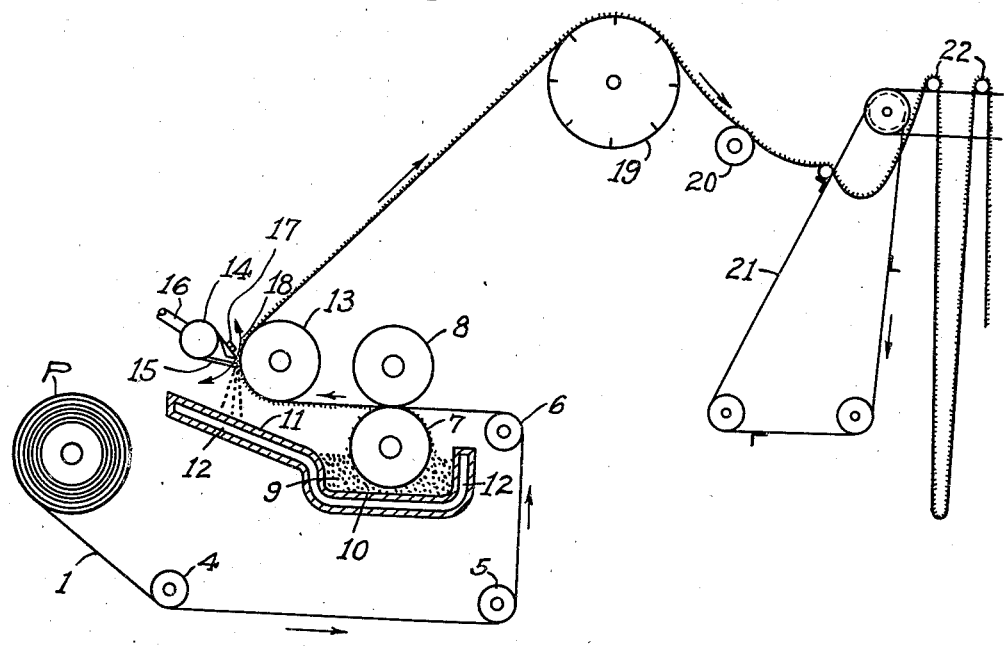
Figure 3 is a diagrammatic side elevation of suitable apparatus for manufacturing abrasive coated webs in accordance with my invention.

Referring now to Figure 3 of the drawing, the backing 1 is passed from the roll "P" around the idler rolls 4, 5 and 6, and between the adhesive roll 7, and the co-acting roll 8. The adhesive pan 10 contains a previously prepared mixture or suspension 9 of particles of abrasive powder and a liquid adhesive binder. The roll 7 is partially immersed in this mixture, and as the roll revolves, it carries a film of the adhesive-grain mixture into contact with the web backing 1. Due to the relatively open spacing between the rolls 7 and 8, an excessively thick layer of the mixture is applied to one side of the backing. The thickness of such an applied layer is regulated by varying the distance between the adjustably spaced rolls 7 and 8.

If desired, the roll 7 may be dispensed with, and the roll 8 lowered so that the granular coated surface of the backing is brought into direct contact with the surface of the mixture of adhesive and abrasive grains contained in the pan 10 and a layer of the mixture applied by the so-called "kiss coating" method. The roll 8 is adjustably supported above the glue pan 10 and provided with adjusting means (not shown) whereby its vertical position may be changed to suit various conditions of coating.

After the mixture or suspension of abrasive grains and adhesive binder has been applied, the coated web is moved over the supporting roll 13 so that it comes in contact with a jet of high velocity gas issuing from the adjustable orifice 15 of the "air knife," which is indicated generally by the reference numeral 14. This jet of high velocity gas serves to remove the excess of the mixture of abrasive grains and adhesive. The uniform action of the jet of gas leaves a smooth, even surface of abrasive-adhesive coating. The action of the "air knife" also serves to force any adhesive binder down from the tips of the abrasive grains to the bases thereof, thus forming a firm support for the grains, and at the same time leaving the peaks of the grains free for subsequent abrading operations.

The excess of the mixture, which is cut off by the "air knife," falls down onto the inclined "apron" 11 of the pan 10, and flows back into the pan, where it is re-mixed with the adhesive-grain mixture, by means of a suitable stirring mechanism (not shown). The mixture is kept at a desired temperature by means of a jacketed pan and apron, the jacket 12 of which may be steam heated, or heated by other suitable means.

The coated web is then passed over a suction drum 19 and idler roll 20 to a suitable drying rack, where it is formed in loops by the festooning device 21 and hung on the supporting bars 22 in a drying or curing chamber, to fully set the adhesive. After drying or curing, the coated web is taken down from the rack, cut into pieces of various sizes, and sold.

Having generally described the invention, specific details are now given by way of illustration, it being understood that these examples are given for illustration only, and are not intended to limit the invention in any way.

Example I

A mixture of abrasive grains and liquid adhesive was made up of the following ingredients and in the following proportions:

| | Grams |
|---|---|
| 600-mesh silicon carbide | 2250 |
| Waterproof varnish adhesive containing 75% solids | 750 |
| High flash naphtha | 800 |

A thick layer of the above mixture was applied to a backing of 40 pound cylinder paper, by means of a pair of cooperating rolls, such as those illustrated in Figure 3 of the drawing. The excess thickness of the coated mixture was then removed by means of an "air knife," operated at a pressure of 2 pounds gage, and an air temperature of 210° F. The orifice of the "air knife" was set at an opening of .010 inch, spaced at a distance of ¼ inch from the coated surface, and directed at an angle of 45° with respect to the coated web and against the direction of movement thereof.

The weight of adhesive-grain mixture remaining on the backing was approximately 3 pounds per ream (480 sheets, 9"x11" in size). The coated article was then baked at a temperature of 200° F. for seven hours, to harden and set the varnish adhesive. A smooth, fine grit abrasive coating was produced, in which the projecting peaks of the abrasive particles were all substantially in the same plane.

Example II

Dry hide glue was dissolved in sufficient water to produce a glue solution of such viscosity that at a temperature of 140° F., 17 seconds was required for 50 cc. to flow through a $\frac{1}{16}$ inch orifice. A mixture of this glue and abrasive grain was made up in the following proportions:

| | Grams |
|---|---|
| Glue | 1400 |
| 400 mesh emery grains | 1600 |

A thick layer of the above mixture was applied to a backing of 40 pound cylinder paper, by means of a pair of cooperating rolls, such as those illustrated in Figure 3 of the drawing. The excess thickness of the coated mixture was then removed by means of an "air knife," operated at a pressure of 3½ pounds gage, utilizing a mixture of steam and compressed air, which was heated to a temperature of 210° F. The orifice of the "air knife" was set at an opening of .010 inch, spaced at a distance of ¼ inch from the coated surface, and directed at an angle of 45° with respect to the coated web and against the direction of movement thereof.

The weight of adhesive-grain mixture remaining on the backing was approximately 3 pounds per ream. The coated article was then permitted to air dry at normal room temperature to harden and cure the glue adhesive. A smooth, fine grit abrasive coating was produced, in which the projecting tips of the abrasive particles were all substantially in the same plane.

While I have described, in the examples above, the use of silicon carbide and emery as the abrasive materials, it is to be understood that other natural and synthetic abrasives, such as flint, garnet, pumice, iron oxide, diatomaceous earth, fused aluminum oxide, etc., may be employed in carrying out the present invention.

The proportions of abrasive grains and adhesive and adhesive solvents must necessarily be varied to suit the conditions, and will depend primarily upon the grain size of the abrasive particles employed. Obviously, it is necessary to adjust the viscosity and character of the adhesive, in order to maintain the abrasive particles in suspension, so that a suitable mixture can be maintained.

The thickness of the gas stream issuing from the "air knife" 14 may be adjusted by means of bolts 17 which regulate the orifice opening of the jet. This orifice opening is readily adjustable from .002 to .025 inch and extends the full width of the web.

It has been found that too thick a stream of gas causes splattering of the mixture and does not cause the film of adhesive to flow down and around the bases of the grains as desired. A jet of approximately .005 inch in thickness is satisfactory for most purposes, though with changes in the size of abrasive particles, it may occasionally be necessary to increase or decrease the orifice adjustment. The leading edge of the gas orifice should be spaced from about $\frac{1}{16}$ inch to $\frac{3}{16}$ of an inch from the surface of the coated web.

The gaseous medium employed is supplied to the jet 14 by means of a flexible hose connection 16 which connects to a suitable source of supply not shown. The internal construction of the "air knife" 14 is such that the gas pressure is equalized and the stream of gas from the orifice is of uniform velocity throughout. The velocity of this gas stream appears to be of considerable magnitude, though it is difficult to express in actual units. It has been found, however, that sufficient velocities may be obtained with a suitably designed jet at relatively low gas pressures ranging from 2 to 15 pounds per square inch gage and with an orifice opening of approximately .005 of an inch. The gas velocity, and hence gage pressure, required will, of course, depend upon the character, condition and thickness of the particular adhesive being used. With thick viscous adhesives, a high gas pressure will be required, and with thin or less viscous adhesives, a relatively lower presure will be required to remove the excess of the mixture.

The character and composition of the gas stream is of particular importance in carrying out the method of the present invention. With adhesives that harden by evaporation of a solvent, it is advisable to introduce a solvent of said adhesive into the gas to prevent premature setting of the adhesive. When using thermoplastic adhesives, the gas may be heated sufficiently to prevent premature chilling and hardening of the adhesive, and with certain adhesives both a solvent and heat may be added to the gas. Hide or animal glue, which falls in the latter classification, is one adhesive often used in the coated abrasive industry, and, for this reason, will be discussed in more detail. Such hide glue is applied to the coated web at a temperature of approximately 150° F. and jells very quickly when the temperature drops much below 140° F. or if there is any substantial evaporation of moisture. If the adhesive-grain mixture is permitted to become set or jelled, the excess of such mixture cannot be properly removed, nor can a smooth surface be obtained. For this reason it is necessary that the gas stream directed against the coated web be humidified with water vapor, which is a solvent for the glue, and heated to a temperature of 212° F. or above. In actual practice it has been found convenient to use a mixture of heated compressed air and steam. The compressed air is heated to approximately 212° F. or above, by means not shown, and sufficient steam mixed therewith to saturate the air with water vapor. It is necessary that the compressed air and steam be thoroughly mixed and, for this reason, a separate mixing chamber (not shown in the drawing) is provided. In certain instances dry steam may be used alone as the gaseous medium, but for most purposes, it is desirable to use a mixture of compressed air and steam.

Certain adhesives, such as varnishes and synthetic resins of the alkyd, urea and phenol formaldehyde types, become softer and more liquid when heated. With these adhesives it is preferable to use hot compressed air as the gaseous medium and to heat the air to a temperature of 100° to 300° F., depending upon the particular solvent employed with the adhesive used.

Most satisfactory results are obtained when the "air knife" is so positioned in relation to the roll 13 as to make an angle between the jet 14 and the web 1 of approximately 45 degrees; for this reason, means are provided (not shown in the drawing) for readily adjusting and maintaining the "air knife" at this angle.

The abrasive coated material made according to the present process does not possess a sharp feel and rapid cutting rate, as compared to ordinary abrasive coated materials, but does possess a very smooth and uniform texture, which is admirably suited to special abrading operations, such as the polishing of metallographic specimens, lens grinding, abrading operations in the manufacture of felt hats, and in finishing leather. For these operations, a very fine grit abrasive grain and a smooth surface coating are most satisfactory. Due to the fact that the cutting points of the particles of abrasive powder lie substantially in the same plane, the finished product is free from deep scratches and surface irregularities, such as those which were produced by irregularly surfaced material, such as that illustrated in Figure 2.

In the granular coated material produced by the present process, the difficulties of streaks and ridges in the surface of the coating have been entirely eliminated. In addition to removing the excess of the adhesive-grain mixture, and forcing the film of adhesive from the tips of the granules, the force of the solvent treated gas stream acts with equal pressure on the coated web, producing a smooth, even finish.

I have illustrated and described the preferred process of my invention, but the invention may be otherwise embodied and practised within the scope of the following claims.

1. The method of manufacturing abrasive coated webs, which comprises the steps of preparing a mixture of a liquid adhesive binder and abrasive grains, said grains being 280 mesh in size or finer, applying a layer of said mixture of excess thickness to the surface of a web, and then directing a high velocity stream of gas against the layer of the mixture of adhesive and abrasive grains, whereby the excess of the mixture is removed and a uniform coating of abrasive grains is produced.

2. The method of manufacturing abrasive coated webs, which comprises the steps of preparing a mixture of a liquid adhesive binder and abrasive grains, said grains being 280 mesh in size or finer, applying a layer of said mixture of excess thickness to the surface of a web, and immediately thereafter directing a high velocity stream of gas containing a solvent of said adhesive against the layer of the mixture of adhesive and abrasive grains, whereby the excess of the mixture is removed and a substantially unitary layer of abrasive grain is produced.

3. The method of manufacturing abrasive coated webs, which comprises the steps of preparing a mixture of a liquid adhesive binder and abrasive grains, said grains being 280 mesh in size or finer, applying a layer of said mixture of excess thickness to the surface of a web, and immediately thereafter directing a high velocity stream of gas emerging from an orifice extending across the full width of said web against the layer of the mixture of adhesive and abrasive grains, whereby the excess of the mixture is removed and a uniform coating of abrasive grains is produced.

4. The method of manufacturing abrasive coated webs, which comprises the steps of preparing a mixture of a liquid adhesive binder and abrasive grains, said grains being 280 mesh in size or finer, applying a layer of said mixture of excess thickness to the surface of a web, and then directing a high velocity stream of gas of .002 to .025 inch in thickness and extending across the full width of said web, against the layer of the mixture of adhesive and abrasive grains, whereby the excess of the mixture is removed and a uniform coating of abrasive grains is produced.

5. The method of manufacturing abrasive coated webs, which comprises the steps of preparing a mixture of a liquid adhesive binder and abrasive grains, said grains being 280 mesh in size or finer, maintaining the mixture at the proper temperature and in a thoroughly mixed condition, applying a layer of the mixture of excess thickness to a web, and immediately thereafter directing a high velocity stream of gas against the layer of the mixture of adhesive and abrasive grains, whereby the excess of the mixture is removed, and a uniform coating of abrasive grains is produced.

JOHN A. WILLIAMSON.